(No Model.) 3 Sheets—Sheet 1.

J. Q. A. NEWSOM.
ROTARY PLOW.

No. 352,956. Patented Nov. 23, 1886.

Witnesses:
Charles S. Heyer
Edward L. Mills

Inventor:
John Q. A. Newsom.
By  Marble
Atty.

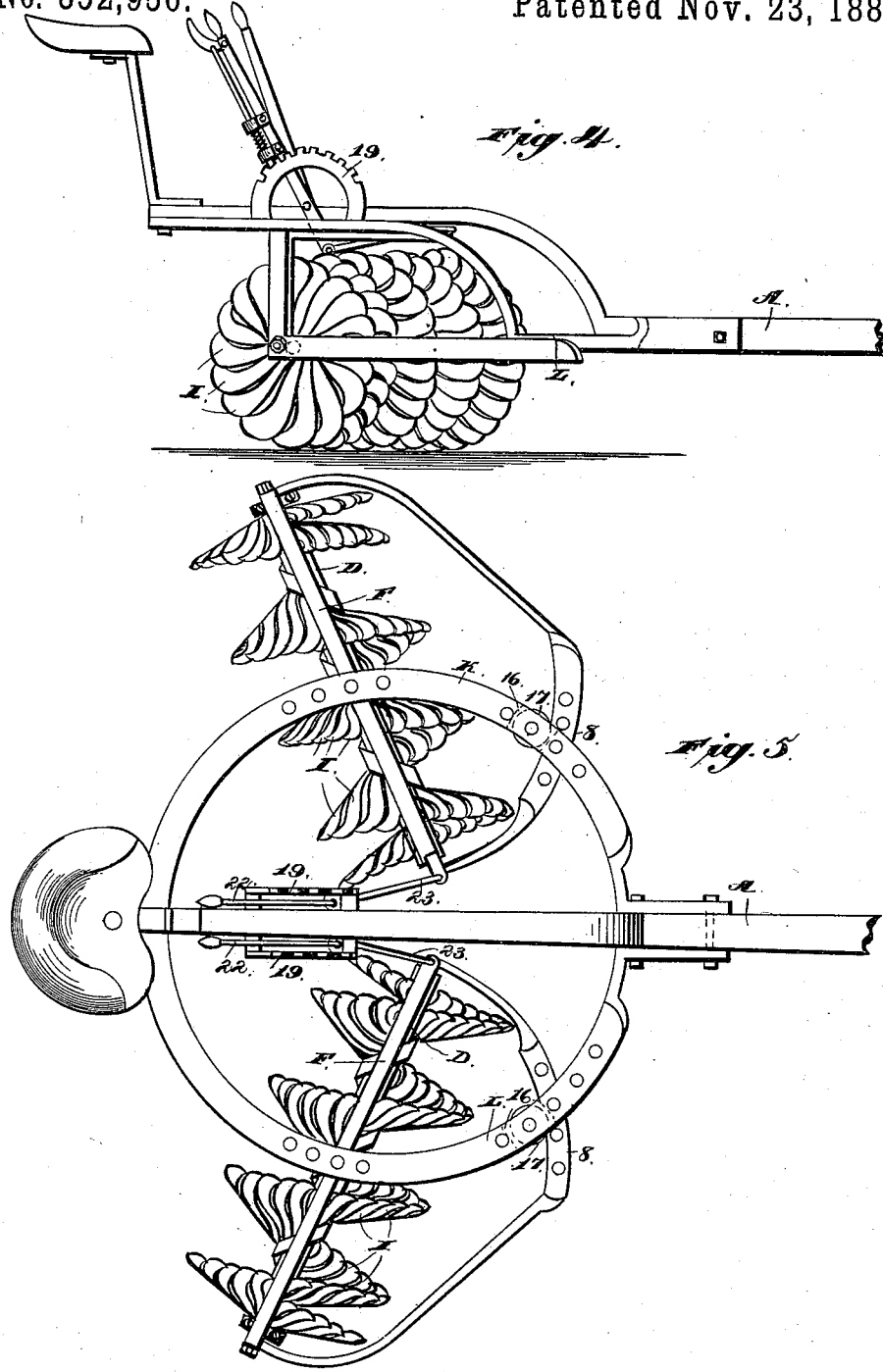

(No Model.) 3 Sheets—Sheet 3.

J. Q. A. NEWSOM.
ROTARY PLOW.

No. 352,956. Patented Nov. 23, 1886.

Witnesses:
Charles S. Hyer.
Edward L. Mills.

Inventor:
John Q. A. Newsom.
By Crumable
Atty.

UNITED STATES PATENT OFFICE.

JOHN Q. A. NEWSOM, OF SEYMOUR, INDIANA.

ROTARY PLOW.

SPECIFICATION forming part of Letters Patent No. 352,956, dated November 23, 1886.

Application filed February 16, 1886. Serial No. 192,104. (No model.)

*To all whom it may concern:*

Be it known that I, JOHN Q. A. NEWSOM, a citizen of the United States, residing at Seymour, in the county of Jackson and State of Indiana, have invented certain new and useful Improvements in Rotary Plows; and I do hereby declare the following to be a full, clear, and exact description of the invention, such as will enable others skilled in the art to which it appertains to make and use the same.

My invention relates to rotary plows; and its object is to provide a plow having a horizontal revolving plow shaft or shafts carrying spirally-arranged cutters, such shafts being adapted, when in use, to be placed at an angle to the line of draft, and to be adjusted relatively thereto so as to change the angle at which the cutters enter the ground, the adjustment being accomplished by mechanism operated by the driver while the plow is in motion and at work.

A further object of the invention is to provide an improved form of rotary cutter to be mounted on the shaft, which will effect a more complete pulverization of the soil than solid spiral blades.

The invention consists, principally, in a plow having a revolving plow-shaft, on which is mounted a series of independent spirally-arranged cutters, which are inclined at an angle to the axis of the shaft and revolve with such shaft, such cutters being of peculiar construction in themselves.

It consists, further, in a plow having a rotary shaft pivoted in a frame-work so as to be swung horizontally at varying angles to the line of draft, and provided with means for adjusting and locking such shaft in position while the plow is at work.

It consists, further, in details of construction, all fully hereinafter described.

Figure 1:
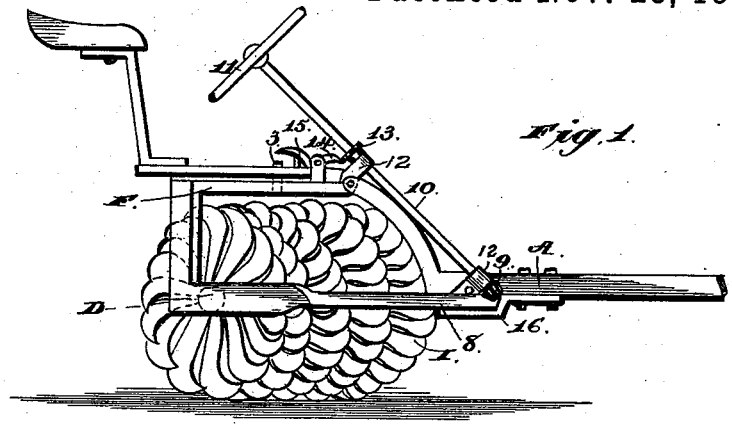
Figure 2:
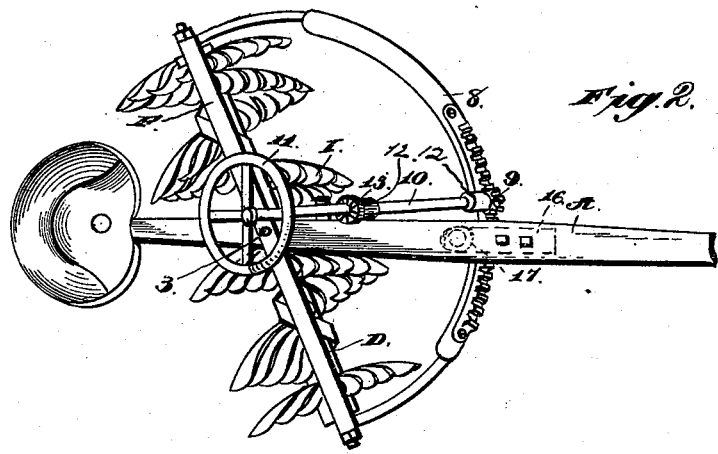
Figure 3:
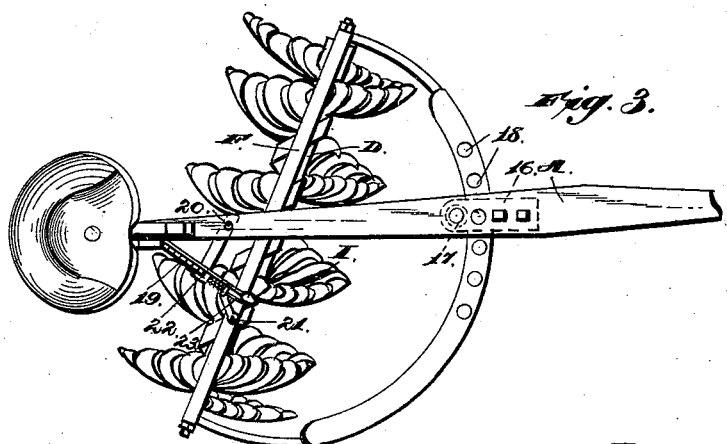
Figure 6:
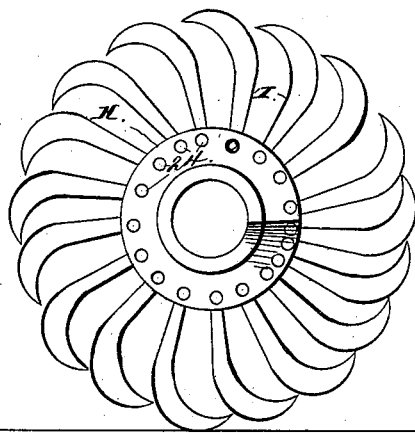
Figure 7:
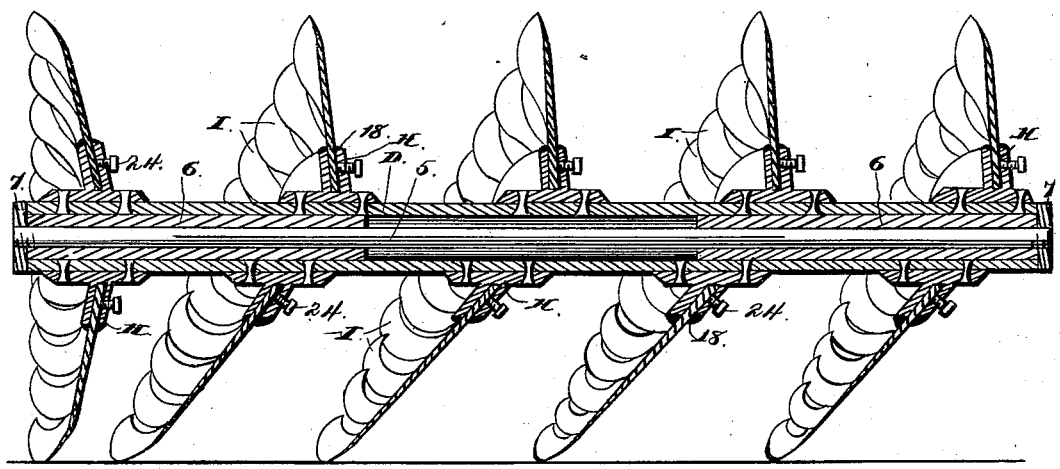

In the accompanying drawings, Figure 1 represents a side elevation of a plow having an inclined plow-shaft and embodying my invention. Fig. 2 is a plan view of the same. Fig. 3 is a plan view of a plow embodying my invention with a modified form of adjustment. Figs. 4 and 5 are respectively an elevation and a plan view showing another form of adjustment in combination. Fig. 6 is a side elevation of my improved rotary spirally-curved cutter. Fig. 7 is a longitudinal section of the plow-shaft and cutters.

Referring to Figs. 1 and 2, A represents the draft-bar tongue, which is a curved beam, Fig. 4, extending horizontally above the plow-disks, and there bent to the proper point for the connection of the plow-frame, from which it extends horizontally forward.

The plow-shaft D is suspended from an angular bolster, F, which is pivoted to the draft-bar A by a bolt, 3, passing through the draft-bar and bolster, which permits the bolster to be swung on the draft-bar turning on its central pivot. The plow-shaft is journaled on a long stationary pin, 5, the bearings being internal sleeves or bushings, 6, secured to the inside of the hollow shaft at each end thereof, and which turn upon the pin, forming long parallel bearings, which are fully protected from dirt by their interior position, as well as by the nuts 7 on the extremities of the pin 5, which hold the parts in place. The pin 5 is secured by the nut in the downward-projecting end of the bolster, so that the plow-shaft and such bolster are suspended from the frame. The bolster and plow-shaft are placed at an angle to the line of draft when in operative position, and provision is made for changing this angle for different kinds of work and soil in which the plows may be used.

In Figs. 1 and 2 a curved segment, 8, is mounted upon the ends of the pin 5, to which is secured a similar-shaped rack having beveled teeth, the center from which the curve is struck being the main pivot-bolt. With this rack engages a beveled pinion, 9, keyed upon an inclined shaft, 10, which carries a hand-wheel, 11, placed within reach of the driver. The shaft is journaled in boxes 12, secured to the draft-bar. A toothed disk, 13, is mounted on the shaft 10, with which engages a pivoted dog, 14, actuated by a spring, 15, and adapted to be depressed by the foot of the driver in order to permit the shaft to be turned by the hand-wheel. A guide-bracket, 16, is secured to the draft-bar, which passes below and supports the segment 8, and in which is journaled a guide-roller, 17, which bears on the inner edge of the segment.

In Fig. 3 I have shown a modified form of adjustment for the plow-frame. The segment 8 in this case is provided with holes 18, registering with a hole in the draft-bar, so that the plow-shaft may be locked constantly and immovably in one position when desired for any special kind of work. For the purpose of ordinary adjustment while the plow is in motion, a rack, 19, of angular shape in plan view, is bolted at two points, 20 21, to the draft-bar. With this rack engages a spring-dog on a pivoted lever, 22, which is connected by a rod, 23, to the bolster, and by which the latter may be turned.

In Figs. 4 and 5 I have shown a plow-frame adapted to support two rotary plow-shafts independently adjustable on each side of the draft-bar. This frame consists of two bars, K L, forming practically a circle and secured rigidly to the rear end of the draft-bar, and, extending forward, Fig. 4, are bent down and twisted and their extension bolted to the draft-bar. This circular frame is designed to give support to two adjustable plow-shafts pivoted on opposite sides of the draft-bar. Perforated segments 8 are secured to the ends of the pins 5, such segments being preferably formed of one bar of metal flattened to bear on the lower faces of the plow-frames.

Registering-holes are formed in the frame and segments, respectively, so that the segment can be moved on the frame as the bolster is turned on its central pivot. It is not necessary, however, as before stated, that a bolt should be used to connect the frame and segment together, although it may be desirable at times when a particular kind of work is to be done requiring a fixed angle to be given the plow-shaft; but when it is desirable to change the angle of the plow-shaft while at work a roller, 17, as before described, is journaled on the frame, which bears on the inner edge of the segment, the latter being supported on the guide-plate 16, which also receives the shaft of the pulley. The adjustment of the plow-shaft and bolster is accomplished by means best shown in Fig. 5. Curved racks 19 are mounted on projecting brackets of the draft-bar. A lever, 22, is pivoted upon each side of the draft-bar, connected by a rod, 23, to the inner end of the bolster. A spring-dog extends along the lever to engage with the rack 19. It will be readily understood that by the operation of this lever the plow-shaft can be placed at any position relatively to the draft-bar, its range being about ninety degrees of a circle, or from a position parallel to draft to one at right angles thereto. Its operative position, however, is always at an angle to the line of draft.

Mounted upon the plow-shaft is a spiral plow or cutter, which may be of the spiral-disk form shown in either of my applications for Letters Patent filed, respectively, March 30, 1885, and February 9, 1886, and numbered, respectively, 160,726 and 191,307; but I prefer in all the forms of plows herein described to use the improved form of plow illustrated in Fig. 6. In that figure, H represents a section of a spiral bracket, the ends of which abut against adjoining sections, and when bolted to the shaft form a continuous spiral bracket having a continuous spiral flange. When the sections of the bracket are cast in one piece, holes 18 are formed in the flanges of the sections, forming a continuous spiral row of holes, each of which receives the rounded shank of one of the cutters I. (Shown in section in Fig. 7.) The brackets may, however, be formed in two parts, having separate spiral flanges placed closely together, so that the knives may be clamped between them by tightening-bolts. In such case each section would be cast with a semicircular recess, to register with the corresponding recess in the outer flange, the two forming the opening for the reception of the shank of the cutter.

The cutters I are knife-edged blades curved slightly laterally near their points, the cutting-edge being formed on the convex part of the blade. These knives are fixed in the holes 18 by set-screws 24, and when in place form a continuous spiral series of cutters inclined to the axis of the shaft, the sharp point of one overlapping the cutting-edge of the next adjacent cutter in the rear. The whole series of cutters act in the same manner as the spiral blades shown in my applications before referred to; but they accomplish a more thorough pulverization of the soil, as will be readily understood from the drawings.

It will be observed that it is unnecessary to provide means for raising the plow from the ground, since by turning the shaft at right angles to the draft-bar the disks will roll on the ground, or only cut so slightly as not to impede transportation.

It is obvious that various changes might be made in the details of construction of my device without departing in any way from the spirit of my invention.

Having thus described my invention, what I claim as new, and desire to secure by Letters Patent, is—

1. A plow having a revolving plow-shaft, on which is mounted a series of independent cutting-knives placed closely together, with the point of each knife overlapping the cutting-blade of the forward knife, and set in a single spiral line, so as to form a continuous series of spiral cutters, substantially as described.

2. A plow having a revolving plow-shaft, on which is mounted a series of cutting-blades independently arranged in the form of disks, said disks being united to form a continuous single-line series of said spiral cutting-blades, the points of said blades overlapping the cutting portion of the forward blades, substantially as described.

3. A plow having a revolving plow-shaft, on which is mounted spirally a series of curved knife edged cutters having sharp points, the point of each cutter overlapping the knife-edged portion of the next adjacent blade in the rear, substantially as described.

4. In a plow, the combination of a revolving plow-shaft, a series of sectional brackets secured thereto, forming a continuous spiral when mounted, independent cutters mounted in sockets in said sectional brackets, and set-bolts for holding said cutters in their desired position, substantially as described.

5. The combination, with the fixed or stationary draft-bar, of a suspended frame and a journaled plow-shaft, a segment attached to the plow-shaft pin at each of its ends adapted to be turned, and mechanism operated by the driver for adjusting the plow frame and shaft relatively to the draft-bar, and locking them in position, substantially as described.

In testimony whereof I affix my signature in presence of two witnesses.

JOHN Q. A. NEWSOM.

Witnesses:
CHARLES S. HYER,
EDWARD L. MILLS.